(12) United States Patent
Han et al.

(10) Patent No.: US 10,730,145 B2
(45) Date of Patent: Aug. 4, 2020

(54) BEAM STRUCTURE AND HYBRID WELDING METHOD THEREOF

(71) Applicant: CRRC QINGDAO SIFANG CO., LTD., Qingdao, Shandong (CN)

(72) Inventors: Xiaohui Han, Shandong (CN); Yanqiang Zhao, Shandong (CN); Yonggang Liu, Shandong (CN); Longxi Liu, Shandong (CN); Chuanqi Tao, Shandong (CN); Xifeng Fang, Shandong (CN); Ruiquan Gao, Shandong (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 0 days.

(21) Appl. No.: 16/099,500

(22) PCT Filed: Aug. 25, 2017

(86) PCT No.: PCT/CN2017/099085
§ 371 (c)(1),
(2) Date: Nov. 7, 2018

(87) PCT Pub. No.: WO2018/188248
PCT Pub. Date: Oct. 18, 2018

(65) Prior Publication Data
US 2020/0023469 A1 Jan. 23, 2020

(30) Foreign Application Priority Data

Apr. 11, 2017 (CN) .......................... 2017 1 0234036
Apr. 11, 2017 (CN) .......................... 2017 1 0234046

(51) Int. Cl.
*B23K 26/348* (2014.01)
*B23K 33/00* (2006.01)
(Continued)

(52) U.S. Cl.
CPC .......... *B23K 26/348* (2015.10); *B23K 33/008* (2013.01); *B23K 2101/006* (2018.08);
(Continued)

(58) Field of Classification Search
CPC ...... B61F 1/00; B61F 1/02; B61F 1/08; B61F 1/10; B23K 33/008; B23K 31/003;
(Continued)

(56) References Cited

U.S. PATENT DOCUMENTS 4,778,098 A * 10/1988 Rimbaud .................. B61F 1/06
228/159
5,221,585 A * 6/1993 Kresse, Jr. ........... B23K 33/008
428/573
(Continued)

FOREIGN PATENT DOCUMENTS

CN 102530008 A 7/2012
CN 202294844 U * 7/2012
(Continued)

OTHER PUBLICATIONS

Machine translation of CN-20229844-U, Mar. 2020.*
(Continued)

*Primary Examiner* — Geoffrey S Evans
(74) *Attorney, Agent, or Firm* — Stites & Harbison, PLLC; David W. Nagle, Jr.

(57) ABSTRACT

A beam structure includes a lower cover plate, an upper cover plate and two side web plates jointed between the upper cover plate and the lower cover plate; wherein the two side web plates are arranged perpendicularly to the upper cover plate and the lower cover plate, respectively, to form a hollow box-shaped structure; rib plates protruding outwardly with a plurality of plug heads are welded within the box-shaped structure; the plug heads are respectively plugged in the upper cover plate, the two side web plates and
(Continued)

the lower cover plate, and each plugging joint is fixed by laser-MAG hybrid welding from outside of the box-shaped structure. The method includes: assembling two side web plates, rib plates and a lower cover plate on an upper cover plate to form a box-shaped structure; and welding each of joints from outside of the box-shaped structure by laser-MAG hybrid welding.

9 Claims, 4 Drawing Sheets

(51) Int. Cl.
  *B23K 101/18* (2006.01)
  *B23K 103/04* (2006.01)
  *B23K 101/28* (2006.01)
  *B23K 101/00* (2006.01)
  *B61F 1/08* (2006.01)

(52) U.S. Cl.
  CPC ...... *B23K 2101/18* (2018.08); *B23K 2101/28* (2018.08); *B23K 2103/04* (2018.08); *B61F 1/08* (2013.01)

(58) Field of Classification Search
  CPC .... B23K 31/02; B23K 26/346; B23K 26/348; B23K 26/1423
  See application file for complete search history.

(56) References Cited

U.S. PATENT DOCUMENTS

2010/0310308 A1* 12/2010 Connell ................ A01B 51/00
                                                       403/187

2014/0061171 A1* 3/2014 Lin ....................... B23K 26/14
                                                       219/121.64
2015/0209909 A1* 7/2015 Shimada .............. B23K 33/008
                                                       403/271

FOREIGN PATENT DOCUMENTS

| CN | 202294854 U | * | 7/2012 | |
|---|---|---|---|---|
| CN | 202703611 U | | 1/2013 | |
| CN | 102974948 A | | 3/2013 | |
| CN | 103085832 A | | 5/2013 | |
| CN | 103085834 A | | 5/2013 | |
| CN | 103862177 A | | 6/2014 | |
| CN | 104551406 A | | 4/2015 | |
| EP | 2047935 A1 | | 4/2009 | |
| WO | WO-2016138774 A1 | * | 9/2016 | B61F 1/00 |

OTHER PUBLICATIONS

Machine translation of CN-20229854-U, Mar. 2020.*
State Intellectual Property Office of the People's Republic of China, International Search Report issued in Application No. PCT/CN2017/099085, dated Jan. 10, 2018.
China National Intellectual Property Administration, Office Action issued in corresponding Application No. CN 201710234036.X dated Mar. 19, 2018.
China National Intellectual Property Administration, Office Action issued in corresponding Application No. CN 201710234036.X dated Nov. 13, 2018.
Numerical Simulation of Welding Deformation for Body Bolster on Subway Underframe, Master Dissertation, Southwest Jiaotong University, 2016. (See CNIPA Office Actions dated Mar. 19, 2018 and dated Nov. 13, 2018).

* cited by examiner

BEAM STRUCTURE AND HYBRID WELDING METHOD THEREOF

CROSS-REFERENCE

The present application claims priorities to Chinese Patent Application No. 2017102340463, filed on Apr. 11, 2017, entitled "Hybrid Welding Method of Sleeper Beam, Sleeper Beam and Rail Vehicle Having the Same" and Chinese Patent Application No. 201710234036X, filed on Apr. 11, 2017, entitled "Hybrid Welding Method of Towing beam, Towing Beam and Rail Vehicle Having the Same", the disclosures of which are incorporated herein by reference in their entireties.

FIELD OF TECHNOLOGY

The present disclosure relates to the fields of rail transit and mechanical manufacturing, and particularly to a beam structure and hybrid welding method thereof.

BACKGROUND

With the rapid popularization of urban rail transit and the significant increase in vehicle speed, higher design and use requirements have been proposed for the beam structures (sleeper beam and towing beam) that constitute the main components of the vehicle body.

The beam structure applied to the rail vehicle is a key component for connecting and carrying the vehicle body and the bogie, and is also a main component for the driving force transmission between the vehicle body and the bogie. Among the existing rail vehicles, taking the subway vehicle as an example, the stainless steel body of the subway vehicle is basically made of austenitic stainless steel material, and only the towing beam structure and the sleeper beam structure are still made of thick plate of carbon steel material. After years of continuous research and improvement, the light-weighting of this type of vehicle body has basically reached the limit. Since the strength of the stainless steel material is higher than that of the ordinary carbon steel material, the development and design of the stainless steel beam structure can significantly reduce the thickness of the plate, thereby achieving the purpose of further reducing the weight of the vehicle body. At the same time, because stainless steel has good corrosion resistance, replacing the traditional carbon steel beam structure with stainless steel beam structure can reduce the manufacturing and maintenance cost of the stainless steel vehicle body without coating process.

However, due to the low thermal conductivity of the stainless steel material, the traditional electric-arc welding method is prone to generate large residual stress and deformation when welding the stainless steel structure. Therefore, when the stainless steel material is used to simply replace the beam structure of the existing carbon steel material, the dimensional requirements of the structural members cannot be guaranteed, and the later service safety (such as stress corrosion performance) thereof is also adversely affected due to the large amount of welding, severe structural deformation and residual stress. Therefore, for the stainless steel beam structural member, in order to reduce the welding deformation and improve the welding quality, the welding method with heat source of high energy density such as laser welding or electron beam welding is preferably to be used.

The laser welding has the advantages of deeper fusion penetration, high efficiency, low welding deformation and stress. However, this method requires rigorous assembly precision of structural members, and it has great difficulties in engineering application from the perspective of welding manufacturing. Electron beam welding requires vacuum environment, it is difficult to weld the large and complex structures. Therefore, in order to replace the carbon steel beam structure with the stainless steel material, new ideas and methods in structure and process need to be proposed.

SUMMARY

(I) Technical Problem to be Solved

The technical problem to be solved by the present disclosure is to provide a beam structure and hybrid welding method thereof, by hybrid welding, the welding deformation can be reduced and the problem of severe residual stress is solved, thereby effectively improving the welding quality.

(II) Technical Solutions

In order to solve the technical problem above, the present disclosure provides a beam structure, including a lower cover plate, an upper cover plate and two side web plates jointed between the upper cover plate and the lower cover plate; wherein the two side web plates are arranged perpendicularly to the upper cover plate and the lower cover plate, respectively, to form a hollow box-shaped structure; rib plates protruding outwardly with a plurality of plug heads are welded within the box-shaped structure; the plug heads are respectively plugged in the upper cover plate, the two side web plates and the lower cover plate, and each plugging joint is fixed by laser-MAG hybrid welding from outside of the box-shaped structure.

Specifically, a rib plate constitution is welded within the box-shaped structure, the rib plate constitution is pre-assembled and welded by a plurality of the rib plates.

Specifically, a coupler mounting assembly is welded at an end of the box-shaped structure, and at least one rib plate is welded within the box-shaped structure.

Specifically, the rib plate constitution includes longitudinal rib plates and lateral rib plates, both ends of a plurality of the lateral rib plates are angle jointed to inner sides of a pair of the longitudinal rib plates, and angled joint between each lateral rib plate and each longitudinal rib plate is fixed by laser-MAG hybrid welding; at least one plug head is provided at either end of each lateral rib plate or longitudinal rib plate.

Specifically, the coupler mounting assembly includes a coupler mounting plate, a mounting fixing plate and reinforcing ribs; an extension plate extends outwardly from an end of the web plate; the coupler mounting plate is angle jointed to an end of the extension plate and welded between the upper cover plate and the lower cover plate, and the coupler mounting plate is arranged perpendicularly to the upper cover plate, the web plates and the lower cover plate respectively; the mounting fixing plate is arranged obliquely on an outer side of the extension plate with one end being welded with the coupler mounting plate, the other end is welded with the extension plate; reinforcing ribs are symmetrically welded on both sides of joint of the web plate and the extension plate.

Specifically, a plurality of plug slots are provided on the upper cover plate, the web plates and the lower cover plate respectively; each of the plug heads cooperates pluggably with the plug slot so as to plug the rib plate in the upper cover plate, the two side web plates and the lower cover plate; the plug head and the plug slot are fixed by the laser-MAG hybrid welding.

Specifically, a welding gap no greater than 0.5 mm is provided between the plug head and the plug slot when the plug head is plugged in the plug slot.

In another aspect, the present disclosure provides a hybrid welding method of beam structure, including the following steps:

S1. assembling two side web plates, rib plates and a lower cover plate on an upper cover plate to form a box-shaped structure;

wherein the rib plate protrudes outwardly with a plurality of plug heads, each of which plugged in the upper cover plate, the two side web plates and the lower cover plate; the upper cover plate and the lower cover plate are arranged oppositely, the two side web plates are jointed between the upper cover plate and the lower cover plate;

S2. welding each of joints from outside of the box-shaped structure by laser-MAG hybrid welding in such a manner that weld the shorter welding seams first and then the longer welding seams, from the center to the two ends symmetrically.

Further, prior to step S1, the method further includes:

S101. angle jointing two ends of a plurality of the lateral rib plates respectively to inner sides of a pair of the longitudinal rib plates;

S102. welding angled joints between the lateral rib plates and the longitudinal rib plates that are connected by the laser-MAG hybrid welding to form a set of rib plate constitution, so that the rib plates are assembled on the upper cover plate in the form of the rib plate constitution;

wherein the lateral rib plates are the rib plates placed laterally on the upper cover plate, the longitudinal rib plates are the rib plates placed longitudinally on the upper cover plate.

Further, step S1 further includes: providing a coupler mounting assembly at an end of the upper cover plate;

wherein the coupler mounting assembly includes a coupler mounting plate, a mounting fixing plate and reinforcing ribs; an extension plate extends outwardly from an end of the web plate; the coupler mounting plate is angle jointed to an end of the extension plate and welded between the upper cover plate and the lower cover plate, and the coupler mounting plate is arranged perpendicularly to the upper cover plate, the web plates and the lower cover plate respectively; the mounting fixing plate is arranged obliquely on an outer side of the extension plate with one end being welded with the coupler mounting plate, the other end is welded with the extension plate; reinforcing ribs are symmetrically welded on both sides of joint of the web plate and the extension plate.

Further, a plurality of plug slots are provided on the upper cover plate, the two side web plates and the lower cover plate, the step S1 includes:

S121. plugging the plug heads at a lower portion of the rib plates in the plug slots of the upper cover plate;

S122. plugging the plug heads at the two sides of the rib plates in the plug slots of the two side web plates so that the two side web plates are respectively perpendicular to the lower cover plate;

S123. plugging the plug heads at an upper portion of the rib plates in the plug slots of the lower cover plate, so that the upper cover plate and the lower cover plate are arranged oppositely.

Further, a welding gap no greater than 0.5 mm is provided between the plug head and the plug slot when the plug head is plugged in the plug slot.

Further, step S2 includes:

S201. welding each of plugging joints of the rib plates between the lower cover plate, the two side web plates and the upper cover plate respectively;

S202. welding joints of the lower cover plate, the two side web plates and the upper cover plate respectively in such a manner that weld the shorter welding seams first and then the longer welding seams, from the center to the two ends and weld symmetrically.

In another aspect, the present disclosure also provides a rail vehicle, which includes the beam structure as described above, wherein the beam structure is welded by the hybrid welding method of beam structure as described above.

(III) Advantageous Effects

The technical solutions above of the present disclosure has the following beneficial effects: for the hybrid welding method of beam structure described by the present disclosure, by welding the stainless steel beam structure with the laser-MAG hybrid welding, and optimizing the plugging structure of the rib plates, the box-shaped structure can be assembled first, and then each of the joints of the box-shaped structure is welded directly from the outside during manufacturing, so that the beam structure as a whole can replace the weathering steel material with the stainless steel material, thereby realizing the weight reduction of the beam structure and improving the corrosion resistance of the beam structure; by disposing the welding seams to be welded on the outer surface of the box-shaped structure through the welding connection means of plugging and angle jointing, the single-sided welding and double-sided forming process of the laser-MAG hybrid welding is adapted; by realizing the self-constraint of welding of the beam structure with the self-rigidity of the plugging structure, the advantages of deep fusion penetration, low heat input, small welding deformation and good gap adaptability of the laser-MAG hybrid welding are exerted, and the maintenance-free manufacturing process of the stainless steel beam structure are realized, thereby effectively improving the manufacturing process efficiency of the rail vehicle and reducing the production costs.

Figure 1:
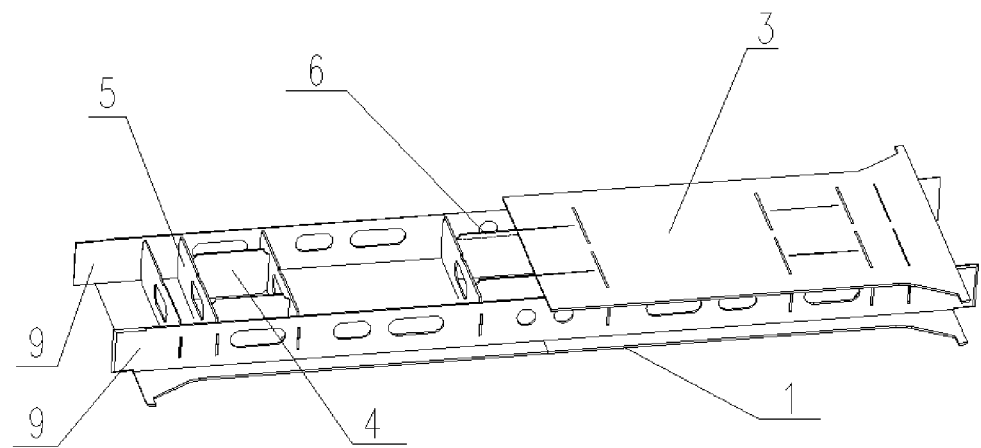
FIG. 1 is a structural diagram of the beam structure according to an embodiment of the present disclosure.

in which, 1. upper cover plate; 2. mounting base; 2'. extension plate; 3. lower cover plate; 4. lateral rib plate; 5. longitudinal rib plate; 5'. coupler mounting plate; 6. plug head; 7. plug slot; 8. end plate; 9. web plate; 10. spacing support; 11. relief; 12. chamfer; 13. reinforcing rib.

DETAILED DESCRIPTION

The specific implementation manners of the present disclosure are further described in detail with reference to the accompanying drawings and embodiments. The following embodiments are used to illustrate the present disclosure, but cannot limit the scope thereof.

In the description of the present disclosure, unless specified otherwise, "a plurality of" means two or more; unless specified otherwise, "notch" means the shapes other than the shape with flush cross section. The orientation or position relations indicated by the terms "upper", "lower", "left", "right", "inside", "outside", "front end", "rear end", "head portion", "tail portion" etc. are based on the orientation or position relations shown in the drawings, which is merely for the convenience of describing the present disclosure and simplifying the description, and is not to indicate or imply that the device or component referred to must have a specific orientation, and be constructed and operated in a specific orientation, thus the terms cannot be construed as limiting the present disclosure.

Embodiment I

As shown in FIG. 1, the present embodiment provides a beam structure including a lower cover plate 3, an upper cover plate 1 and two side web plates 9 jointed between the upper cover plate 1 and the lower cover plate 3. The two side web plates 9 are arranged perpendicularly to the upper cover plate 1 and the lower cover plate 3, respectively, to form a hollow box-shaped structure. Rib plates 4 protruding outwardly with a plurality of plug heads are welded within the box-shaped structure. The plug heads are respectively plugged in the upper cover plate 1, the two side web plates 9 and the lower cover plate 3. Each plugging joint is fixed by laser-MAG hybrid welding from outside of the box-shaped structure.

Embodiment II

Figure 2:
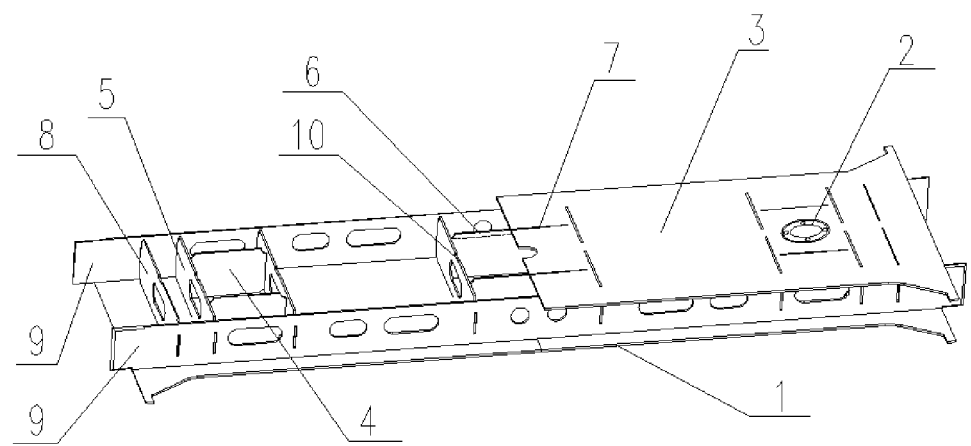
FIG. 2 is a structural diagram of the beam structure according to an embodiment of the present disclosure.
Figure 3:
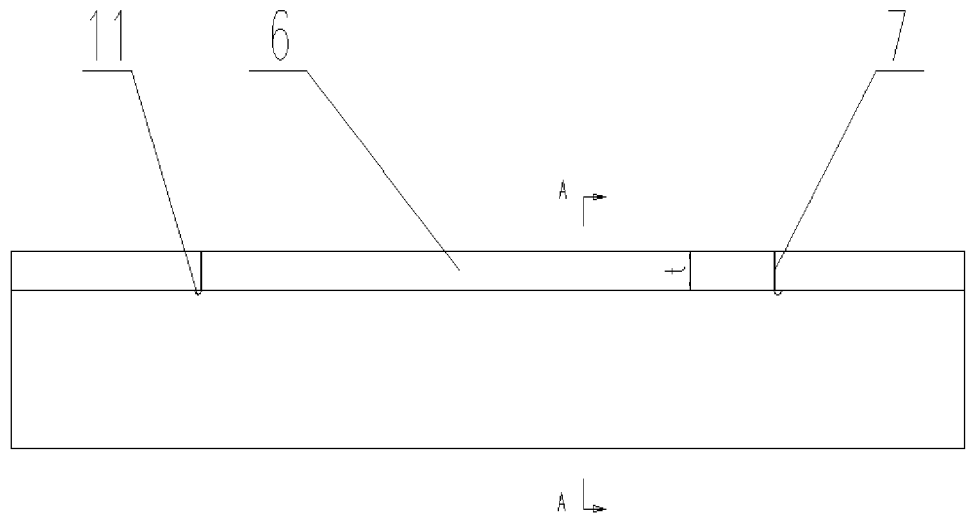
FIG. 3 is a front view showing the assembly of the plug head and the plug slot according to an embodiment of the present disclosure.
Figure 4:
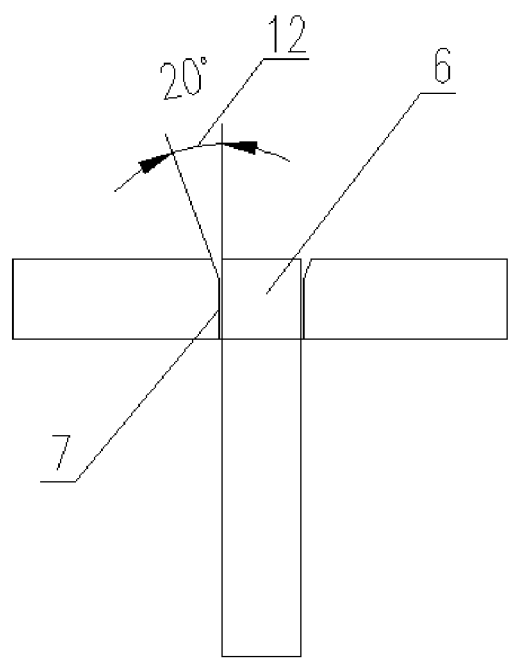
FIG. 4 is a side view showing the assembly of the plug head and the plug slot according to an embodiment of the present disclosure.
Figure 5:
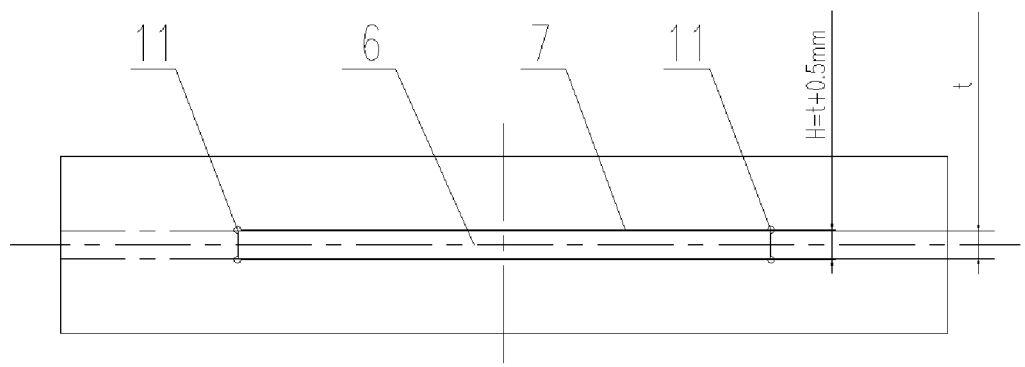
FIG. 5 is a top view showing the assembly of the plug head and the plug slot according to an embodiment of the present disclosure.

The present embodiment provides a beam structure, as shown in FIG. 2, the beam structure adopts austenitic stainless steel material SUS301L instead of weathering steel material to reduce the weight of the beam structure and improve the corrosion resistance of the beam structure.

Specifically, the beam structure includes a lower cover plate 3, an upper cover plate 1 and two side web plates 9 jointed between the upper cover plate 1 and the lower cover plate 3. The two side web plates 9 are arranged perpendicularly to the upper cover plate 1 and the lower cover plate 3 respectively. The lower cover plate 3, the two side web plates 9 and the upper cover plate 1 are welded to form a hollow box-shaped structure, in which the rib plate constitution is welded. The rib plate constitution is pre-assembled and welded by a plurality of rib plates, and the assembled rib plate constitution protrudes outwardly with a plurality of plug heads 6 for a subsequent plugging operation. In order to demonstrate the internal construction of the box-shaped structure, the lower cover plate 3 is not completely shown in FIG. 2. The rib plate constitution is plugged in the lower cover plate 3, the two side web plates 9 and the upper cover plate 1 respectively. The plugging joints are fixed by laser-MAG hybrid welding, and each of the plugging joints on the box-shaped structure is directly welded from the outside of the box-shaped structure during welding.

The MAG above is an abbreviation of Metal Active-Gas Welding.

The laser-arc hybrid welding technology is a combination of the separate laser welding and arc welding. At present, arc welding has been widely used in production practice, but arc welding has the disadvantages that the welding efficiency is low, the deformation is large, the consumables are expensive, and the requirements of the welder are high, and the types of weldable alloys are limited. Although laser welding has been used for not so long, it has been widely developed and applied due to the high welding power density, large weld width ratio, fast welding speed and small deformation. However, the high-power laser devices are expensive, have poor bridging capabilities, and have high requirements of welding pretreatment. When the laser and arc are combined and acted on the weldments, the effect is not only a simple superposition of the two welding effects, but can have a synergistic effect of "1+1>2".

During laser-arc hybrid welding, the arc can reduce the reflectivity of the base metal to the laser, thereby reducing the shielding effect of the laser induced plasma, improving the energy utilization rate and reducing the power requirements of the laser devices; and the laser can provide a conductive path for the arc to attract and compress the arc so as to stabilize the arc and increase the fusion penetration. Therefore, the laser-arc hybrid welding can compensate for the shortcomings of single heat source welding through the interaction of heat sources, and has many advantages such as large fusion penetration, fast processing speed, small deformation of the workpiece, strong bridging ability of the weld pool and many weldable materials.

The laser-MAG hybrid welding not only has the advantage of effectively coupling the laser and arc energy, but also can easily adjust the composition of the welding seams and the organizational structure by filling the welding wire material so as to eliminate the metallurgical defects of the welding seams. At the same time, by filling the metal it is possible to enlarge the assembly tolerance of the welding workpiece, reduce the precision requirements of the groove preparation and clamping of the workpiece, effectively eliminate the defects of the welding seams such as undercut and incomplete welding when separately welding the thick plate by laser, increase the fusion penetration and speed of welding to a greater extent and increase the weldable range of welding.

In the beam structure of the present embodiment, the plurality of rib plates are preferably pre-assembled and fixed to form the rib plate constitutions by laser-MAG hybrid welding, and then the whole structure of the beam structure is welded by laser-MAG hybrid welding. The plurality of plug heads 6 extrude outwardly from the rib plate constitution, a plurality of plug slots 7 are respectively arranged on the lower cover plate 3, the side web plates 9 and the upper cover plate 1. By the plugging cooperation between each of the plug heads 6 and the plug slots 7, the lower cover plate, the two side web plates and the upper cover plate are plugged sequentially on at least one set of the rib plate constitutions to form the hollow box-shaped structure, so that the welding seams to be welded are disposed on an outer surface of the box-shaped structure. By directly fixing the plug heads 6 with the plug slots 7 from the outside of the box-shaped structure with the laser-MAG hybrid welding, the single-sided welding and double-sided forming process of the laser-MAG hybrid welding is adapted. The plugging cooperation between the plug head and the plug slot has a great self-rigidity, which is able to realize a self-constraint of the beam structure welding, thereby exerting the advantages of deep fusion penetration, low heat input, small welding deformation and good gap adaptability of the laser-MAG hybrid welding, thereby realizing the maintenance-free manufacturing process of the stainless steel beam structure.

In order to achieve a good bearing capacity of the beam structure and to ensure a reliable assembly of the rib plate constitution with the various components of the box-shaped structure so as to ensure that the assembly precision and the welding parameters meet the requirements in the subsequent welding, it is preferred that the rib plate constitution includes longitudinal rib plates 5 and lateral rib plates 4. The lateral rib plates 4 are the rib plates placed laterally on the upper cover plate 1, and the longitudinal rib plates 5 are the rib plates placed longitudinally on the upper cover plate 1.

Both ends of the plurality of the lateral rib plates 4 are respectively angle jointed to inner sides of a pair of the longitudinal rib plates 5, and the angled lateral rib plates 4 and the longitudinal rib plates 5 are preferably perpendicular to each other. Each of the angled joints between the lateral rib plates 4 and the longitudinal rib plates 5 is fixed by the laser-MAG hybrid welding. At least one plug head 6 is provided at either end of each of the lateral rib plates 4 or the longitudinal rib plates 5. When a plurality of plug heads 6 are simultaneously provided at either end of the lateral rib plate 4 or the longitudinal rib plate 5, a spacing support 10 is provided between adjacent plug heads 6 on each end. By using the spacing support 10, the plugging strength between the plug slot 7 and the plug head 6 can be ensured, so as to prevent the plug head 6 or the plug slot 7 from being broken during plugging assembly. When the plug head 6 is plugged in the plug slot 7, a welding gap no greater than 0.5 mm is provided between the plug head 6 and the plug slot 7. The reserved welding gap can ensure that the welding rod is well filled in the welding seams when the laser-MAG hybrid welding is used, so as to ensure that the single-sided welding and double-sided forming process is realized, so that the welding seams of the beam structure have the characteristics of narrow welding gap, deep fusion penetration and good gap adaptability.

In the present embodiment, the beam structure is preferably the 4 mm-8 mm austenitic stainless steel material of SUS301L series instead of the 5 mm-16 mm weathering steel material, which realizes the weight reduction of the beam structure from the perspective of material selection and improves the anti-corrosion performance; in addition, with the advantage of deep fusion penetration of the laser-MAG hybrid welding, the joint is completely penetrated, which greatly reduces the filling amount of deposited metal and further realizes the weight reduction.

In the embodiment, the rib plate constitution is preferably a rectangular structure, that is, two lateral rib plates 4 are oppositely arranged, and two ends of each of the lateral rib plates 4 are respectively angled between two longitudinal rib plates 5. In order to facilitate plugging in the plug slots 7 of the upper cover plate 1, the lower cover plate 3 or the web plates 9, the lateral rib plates 4 and the longitudinal rib plates 5 are rectangular. All of four sides of the longitudinal rib plate 5 are provided with plug heads 6. Two longer sides are respectively provided with two plug heads 6, while two shorter sides are respectively provided with one plug head 6. The plug heads 6 protrude outwardly and a notch is provided between two adjacent plug heads 6 on the two longer sides as the spacing support 10 for assembling spacing and self-constraint of welding. At the same time, two plug slots 7 are arranged corresponding to the positions for plugging the two plug heads 6 on the longer sides of the upper cover plate 1 and the lower cover plate 3, the two plug slots 7 are spaced apart by a certain distance so that the notch between the two adjacent plug heads 6 can provide sufficient support for the spacing of the two plug slots 7, so as to prevent the plug slot 7 from being broken due to excessive length, meanwhile fixing and spacing the two adjacent plug heads 6, thereby effectively preventing the misplacement between the plug heads 6 and the plug slots 7 so as to ensure a stable plugging.

As shown in FIG. 3 to FIG. 7, the plug head 6 is a protruded plate disposed at the end of the longitudinal rib plate 5. The thickness of the protruded plate is t, the width of the plug slot 7 is H, the length of the protruded plate is L, and the length of the plug slot 7 is L', therefore $0 \leq (H-t) \leq 0.5$ mm, and $0 \leq (L'-L) \leq 0.5$ mm, so as to ensure that a welding gap no greater than 0.5 mm is reserved between the plug head 6 and the plug slot 7. The preferred welding gap restriction of 0.5 mm ensures the assembly feasibility, and is also within the adaptability range of the gap of the laser-MAG hybrid welding, therefore it adapts to the gap tolerance of the laser-MAG hybrid welding and the adaptability of the process parameters to the gap during actual welding, and ensures the strong consistency of the welding seams.

The plug slots 7 provided on the upper cover plate 1, the lower cover plate 3 and the web plates 9 are preferably rectangular, and four corners thereof are provided with reliefs 11, which avoids the assembly obstacles meanwhile eliminating the internal stress between the plug heads 6 and the plug slots 7, thereby preventing cracking at the four corners of the plug slot 7 during welding and bearing that affects the overall strength of the structural member. Chamfers 12 are provided on the welding side of the plug slot 7. The angle of the chamfer 12 is preferably 20°, and the depth is preferably 2 mm, which are used for the tracking of the welding seams of the laser-MAG hybrid welding and the filling of the deposited metal.

When the plug head 6 is preferably plugged in the plug slot 7, the end surface of the plug head 6 is flush with the surface of the plug slot 7 to ensure that the surface of the welding seam is smooth and the joint strength of the welding seam is reliable after welding.

The lower cover plate 3 and the upper cover plate 1 are respectively welded to the two side web plates 9 through T-shaped joints that are advantageous for eliminating the stress concentration and facilitating the laser-MAG welding. The T-shaped joint is preferred to leave no gap. Alternatively, a groove with an angle of 20° and a depth of 2 mm can be arranged on the welding side of the web plates 9 so as to ensure the forming of the surface of the welding seam. A plurality of oblong holes are formed in an axial direction on the web plate 9 for further reducing the weight of the connecting members on the basis of maintaining the original structural strength thereof.

The beam structure of the present embodiment further includes a mounting base 2 for mounting an air spring. The mounting base 2 is fixed on a panel at the two ends of the lower cover plate 3, and the outside thereof is surrounded by the rib plate constitution, that is, the lateral rib plates 4 and the longitudinal rib plates 5 with a set of the rib plate constitution are angled around the mounting base 2 to form a rectangular structure, so as to ensure the bearing strength around the mounting base 2. Preferably, at least one set of the rib plate constitution is pluggable welded between two mounting bases 2, so as to ensure the bearing strength and anti-bending strength in the middle of the beam structure. The beam structure of the present embodiment II is also welded and fixed with an air spring and a towing pin base plate (not shown in the drawings).

The beam structure of the present embodiment is preferably used as the sleeper beam of a rail vehicle.

Embodiment III

The present embodiment provides a hybrid welding method of beam structure, by which the beam structure as described in embodiments I and II can be welded, so that the weathering steel material can be replaced by the stainless steel material for the whole beam structure, thereby realizing the weight reduction of the beam structure and improving the corrosion resistance of the beam structure, and the beam structure has the process effect of single-sided welding and double-sided forming, which can reduce the welding deformation, solve the problem of serious residual stress, so as to effectively improve the welding quality and realize the maintenance-free manufacturing process of the stainless steel beam structure.

Figure 8:
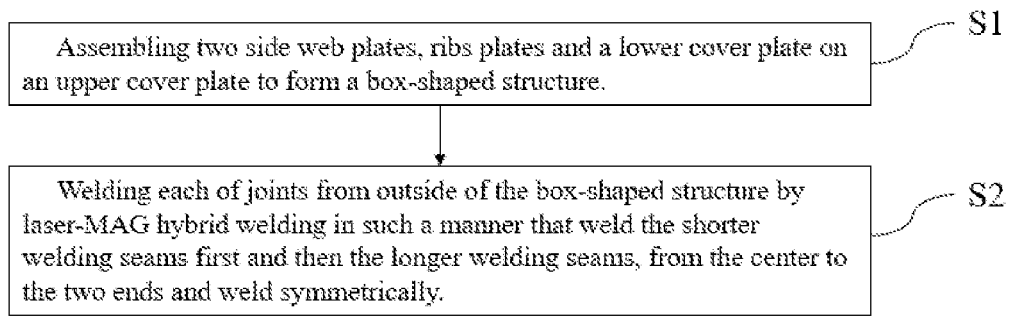
FIG. 8 is flow chart of the hybrid welding method of beam structure according to an embodiment of the present disclosure.

As shown in FIG. 8, the method includes the following steps:

S1. assembling two side web plates, rib plates and a lower cover plate on an upper cover plate to form a box-shaped structure;

wherein the rib plate protrudes outwardly with a plurality of plug heads, each of which plugged in the upper cover plate, the two side web plates and the lower cover plate; the upper cover plate and the lower cover plate are arranged oppositely, the two side web plates are jointed between the upper cover plate and the lower cover plate;

S2. welding each of joints from outside of the box-shaped structure by laser-MAG hybrid welding in such a manner that weld the shorter welding seams first and then the longer welding seams, from the center to the two ends and weld symmetrically.

In the embodiment, prior to step S1, the method further includes:

S101. angle jointing both ends of a plurality of the lateral rib plates respectively to inner sides of a pair of the longitudinal rib plates;

S102. welding angled joints between the lateral rib plates and the longitudinal rib plates that are connected by the laser-MAG hybrid welding to form a set of rib plate constitution, so that the rib plates are assembled on the upper cover plate in the form of the rib plate constitution;

wherein the lateral rib plates are the rib plates placed laterally on the upper cover plate, the longitudinal rib plates are the rib plates placed longitudinally on the upper cover plate.

The method completes the plugging of each of the components of the beam structure by pre-assembling the rib plate constitution, and disposes the welding seams to be welded on the outer surface of the box-shaped structure by the welding connection means of plugging and angle jointing, which provides a structural basis for the subsequent integral welding process directly from the outside so as to adapt to the single-sided welding and double-sided forming process of the laser-MAG hybrid welding, while effectively reducing the welding length and replacing the longer welding seams with multiple sets of shorter welding seams to ensure the subsequent welding strength. The method allows finally welding orderly on the outside directly, which exerts the advantages of deep fusion penetration, low heat input, small welding deformation and good gap adaptability of the laser-MAG hybrid welding, thereby realizing the maintenance-free manufacturing process of the stainless steel beam structure. In addition, the process above is more conducive to industrial flow production operations, which greatly reduces the production costs. Further, since the laser-MAG hybrid welding is used, the assembly size requirement is effectively reduced, the quality control of flow production is effectively improved and the production efficiency is improved.

The welded rib plate constitution forms a rectangular structure, and the plug heads 6 protruding outwardly from the lateral rib plates 4 and the longitudinal rib plates 5 can be directly plugged in the plug slots 7 in the upper cover plate 1, the lower cover plate 3 and the web plates 9, so as to form a mesh structure inside the box-shaped structure of the beam structure, thereby simultaneously increasing the bearing capacity, bending resistance and shear resistance of the beam structure.

In this method, in order to facilitate the plugging, a plurality of plug slots 7 are respectively arranged on the lower cover plate 3, the two side web plates 9 and the upper cover plate 1. By plugging and assembling, each of the reserved welding seams is reserved on the outer surface of the beam structure, so as to weld directly from the outside with single-sided welding. Specifically, step S1 includes the following steps:

S121. plugging the plug heads 6 at a lower portion of the rib plates 4, 5 in the plug slots 7 of the upper cover plate 1;

S122. plugging the plug heads 6 at the two sides of the rib plates 4, 5 in the plug slots 7 of the two side web plates 9 so that the two side web plates 9 are respectively perpendicular to the lower cover plate 3;

S123. plugging the plug heads 6 at an upper portion of the rib plates 4, 5 in the plug slots 7 of the lower cover plate 3, so that the upper cover plate 1 and the lower cover plate 3 are arranged oppositely, thereby completing the complete assembly of the beam structure in order to synchronize the subsequent welding process.

In addition, since a mounting base 2 is arranged on the lower cover plate 3, and the two ends of the beam structure is closed by end plates 8, the detailed steps of another step S1 are provided herein. Specifically, step S1 includes the following steps:

S111. plugging the end plates 8 and the mounting base 2 in the two ends of the lower cover plate 3 respectively according to an order from the outside to the inside, wherein the plug heads 6 at a lower portion of the end plate 8 are plugged in the plug slots 7 correspondingly arranged on one end of the lower cover plate 3;

S112. plugging each of the plug heads 6 at the lower portion of any set of the rib plate constitutions in each of the corresponding plug slots 7 on the lower cover plate 3 respectively, so that the set of the rib plate constitution is arranged outside the mounting base 2 and/or between two mounting bases 2, thereby not only improving the strength around the mounting base 2 but also increasing the strength of the middle of the beam structure;

S113. plugging the plug heads 6 at the two sides of all of the rib plate constitutions and the plug heads 6 at the two sides of the two end plates 8 in each of the plug slots 7 correspondingly arranged on the two side web plates 9 respectively, so that the two side web plates 9 are perpendicular to the lower cover plate 3 and the two end plates 8 respectively;

S114. plugging each of the plug heads 6 at upper portions of all of the rib plate constitutions and the plug heads 6 at upper portions of the two end plates 8 in each of the plug slots 7 correspondingly arranged on the upper cover plate 1, so that the upper cover plate 1 and the lower cover plate 3 are arranged oppositely, thereby completing the complete assembly of the beam structure in order to synchronize the subsequent welding process.

In this method, step S2 is the welding process of the beam structure, includes:

S201. welding plugging joints of the rib plate constitutions between the lower cover plate 3, the two side web plates and the upper cover plate 1 respectively;

S202. welding joints between the lower cover plate 3, the two side web plates 9 and the upper cover plate 1 respectively in such a manner that weld the shorter welding seam first and then the longer welding seams, from the center to the two ends and weld symmetrically, so as to complete the overall structure welding of the beam structure.

With the principle of welding the shorter welding seams first and then the longer welding seams, from the center to the two ends and weld symmetrically, the step S202 above implements the laser-MAG hybrid reverse welding that is mainly for plugging and auxiliary for angle jointing, such as firstly welding the plugging joints of the rib plate constitutions with the upper cover plate 1, the lower cover plate 3 or the web plates 9 respectively, then welding the plugging joints of the end plates with the upper cover plate 1, the lower cover plate 3 or the web plates 9, and finally welding the longer welding seams of the web platers 9 with the upper cover plate 1 and the lower cover plate 3, and the welding is from the center to the two ends and symmetrical. Therefore, the strength of the structural members of the beam structure is ensured to be symmetrical so as to ensure the welding quality.

In addition, since the welding process of step S2 is following step S1, the entire beam structure can be assembled first and then welded in the order of the process, so that the frame-type assembly line can be formed and the production efficiency can be improved.

Embodiment IV

On the basis of the method of embodiment III, the present embodiment provides a more complete embodiment of the beam structure welding process for further perfecting the method described in embodiment III in detail.

The method described in the present embodiment is based on the processing principle that the assembly is first and the component is following. According to the order, the manufacturing process of the beam structure includes five steps of pre-assembling of the rib plate assembly, assembly welding of the beam structure, processing of the beam structure, assembly welding of the base plate and processing of the base plate.

Step (1) of pre-assembling of the rib plate assembly: angle jointing two ends of a pair of lateral rib plates 4 between a pair of longitudinal rib plates 5 respectively with an explorator so as to pre-assemble a rectangular structure, then welding the angled joints with the laser-MAG hybrid welding; wherein process volume of 0.5 mm is added to the length dimension of the lateral rib plate 4 so as to complete the pre-assembling of the rib plate assembly.

Step (2) of assembly welding of the beam structure: assembling the lower cover plate 3, two mounting bases 2, two end plates 2, three sets of rib plate constitutions, two side web plates 9 and the upper cover plate 1 sequentially on the assembly welding turntable of the beam structure according to the method of embodiment II; implementing the laser-MAG hybrid reverse welding that is mainly for plugging and auxiliary for angle jointing according to the principle of welding the shorter welding seams first and then the longer welding seams, from the center to the two ends and weld symmetrically after being pressed by the tooling; the pressing tooling can be unloaded after cooling, so as to complete the welding of the beam structure.

Step (3) of processing of the beam structure: machining the base plate area on the lower cover plate 3 of the beam structure, wherein the processing volume of the lower cover plate 3 is no more than 1 mm.

Step (4) of assembly welding of the base plate: assembling the air spring and the towing pin base plate on the lower cover plate 3 and pressing them, implementing the laser-MAG hybrid welding to the lapping angle welding seams between the air spring and the towing pin base plate with the lower cover plate 3; the pressing tooling can be unloaded after cooling, so as to complete the assembly welding of the base plate.

Step (5) of processing of the base plate: machining the air spring and the towing pin base plate (not shown in the drawings) of the beam structure, and the processing volume is no more than 4 mm.

Embodiment V

Figure 9:
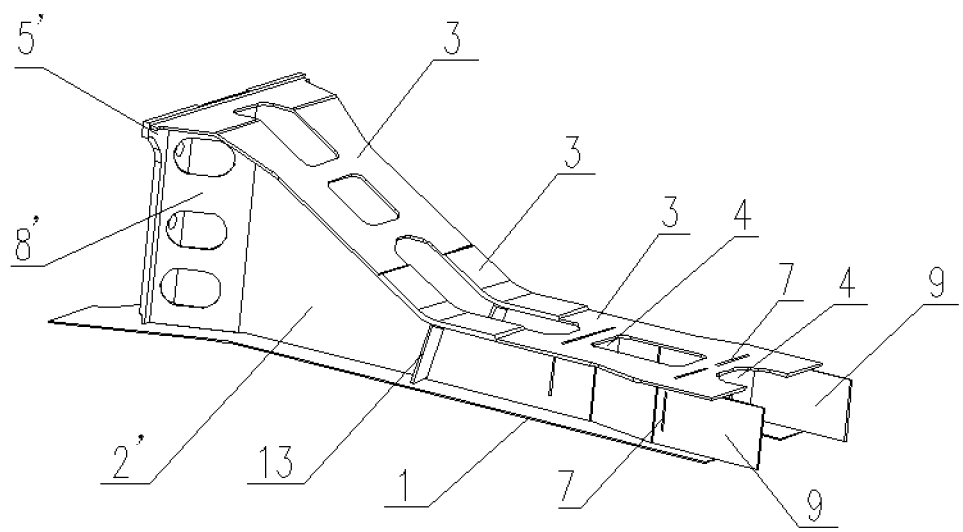
FIG. 9 is a structural diagram of the beam structure according to an embodiment of the present disclosure.

The present embodiment provides a beam structure, as shown in FIG. 9, the beam structure adopts austenitic stainless steel material SUS301L instead of weathering steel material, and adopts 20 mm duplex stainless steel material with a type of EN1.4462 instead of the 40 mm low alloy structural steel, so as to reduce the weight of the beam structure and improve the corrosion resistance of the beam structure.

Specifically, the beam structure includes an upper cover plate 1, a lower cover plate 3 and two side web plates 9 jointed between the upper cover plate 1 and the lower cover plate 3. The two side web plates 9 are arranged perpendicularly to the upper cover plate 1 and the lower cover plate 3 respectively to form a hollow box-shaped structure. An end portion of the box-shaped structure is welded with a coupler mounting assembly for connecting with a coupler. At least one rib plate 4 protruding outwardly with a plurality of plug heads 6 is welded within the box-shaped structure, so that the rib plate 4 is plugged in the upper cover plate 1, the two side web plates 9 and the lower cover plate 3 respectively with the plug heads 6. In the embodiment, plugging joints are fixed through laser-MAG hybrid welding by directly welding each of joints on the box-shaped structure from outside of the box-shaped structure.

In the beam structure of the present embodiment, since the rib plate 4 extrudes outwardly with a plurality of plug heads 6, a plurality of plug slots 7 is arranged on the lower cover plate 3, the side web plates 9 and the upper cover plate 1 respectively at the positions where the rib plate 4 needs to be mounted, so as to plug each of the rib plates on the lower cover plate 3, the two side web plates 9 and the upper cover plate 1 sequentially by the plugging cooperation between each of the plug heads 6 and the plug slots 7, so that the welding seams to be welded are disposed on an outer surface of the box-shaped structure. By directly fixing the plug heads 6 with the plug slots 7 from the outside of the box-shaped structure with the laser-MAG hybrid welding, the single-sided welding and double-sided forming process of the laser-MAG hybrid welding is adapted. The plugging cooperation between the plug head and the plug slot has a great self-rigidity, which is able to realize a self-constraint of the beam structure welding, thereby exerting the advantages of deep fusion penetration, low heat input, small welding deformation and good gap adaptability of the laser-MAG hybrid welding, thereby realizing the maintenance-free manufacturing process of the stainless steel beam structure.

Figure 6:
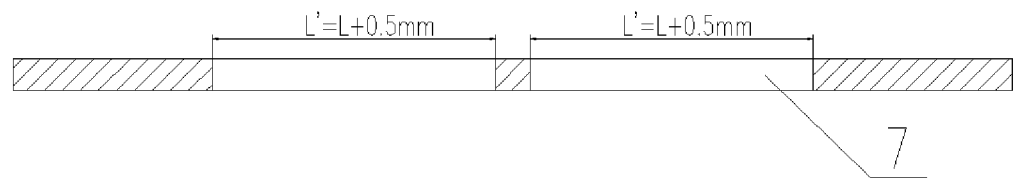
FIG. 6 is a structural diagram of the plug slot according to an embodiment of the present disclosure.
Figure 7:
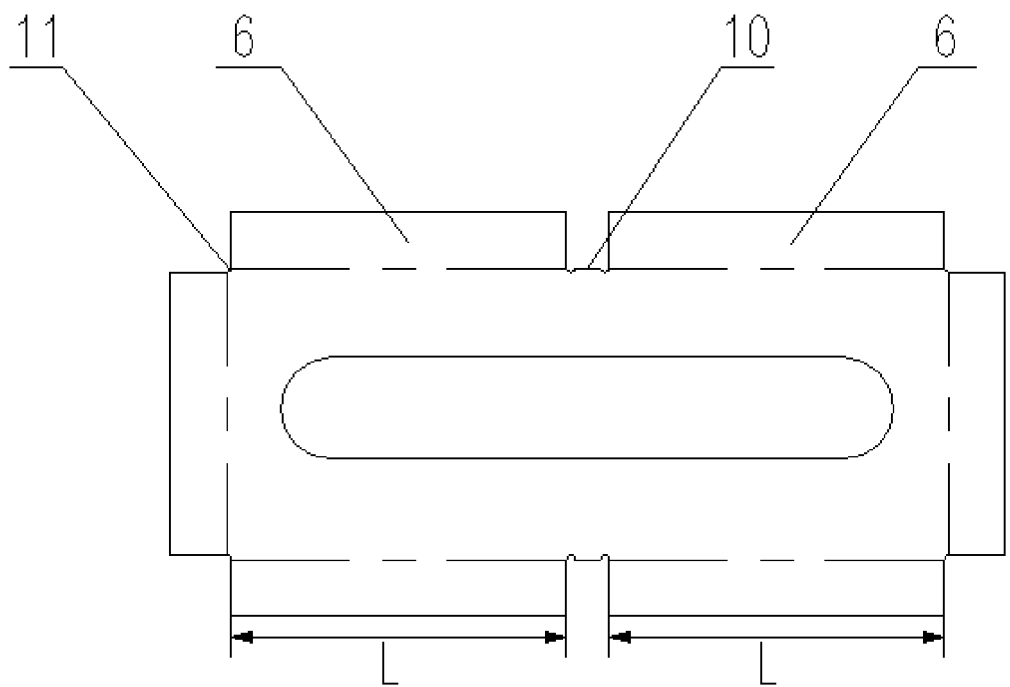
FIG. 7 is a structural diagram of the rib plate having the plug head according to an embodiment of the present disclosure.

In order to achieve a good bearing capacity of the beam structure and to ensure a reliable assembly of the rib plate 4 with the various components of the box-shaped structure so as to ensure that the assembly precision and the welding parameters meet the requirements in the subsequent welding, as shown in FIG. 6, at least one plug head 6 is provided at either end of each of the lateral rib plates 4. When a plurality of plug heads 6 are simultaneously provided at either end of the lateral rib plate 4, a spacing support 10 is provided between adjacent plug heads 6 on each end. By using the spacing support 10, the plugging strength between the plug slot 7 and the plug head 6 can be ensured, so as to prevent the plug head 6 or the plug slot 7 from being broken during plugging and assembly. When the plug head 6 is plugged in the plug slot 7, a welding gap no greater than 5 mm is reserved between the plug head 6 and the plug slot 7. The reserved welding gap can ensure that the welding rod is well filled in the welding seams when the laser-MAG hybrid welding is used, so as to ensure that the single-sided welding and double-sided forming process is realized, so that the welding seams of the beam structure have the characteristics of narrow welding gap, deep fusion penetration and good gap adaptability.

In the present embodiment, the beam structure is preferably the 4 mm-8 mm austenitic stainless steel material of SUS301L series instead of the 5 mm-16 mm weathering steel material, and adopts 20 mm duplex stainless steel material instead of the 40 mm low alloy structural steel, which realizes the weight reduction of the beam structure from the perspective of material selection and improves the anti-corrosion performance; in addition, with the advantage of deep fusion penetration of the laser-MAG hybrid welding, the joint is completely penetrated, which greatly reduces the filling amount of deposited metal and further realizes the weight reduction.

In the embodiment, in order to facilitate plugging in the plug slots 7 of the upper cover plate 1, the lower cover plate 3 or the web plates 9, the rib plates 4 are preferred to be rectangular. All of four sides of the rib plate 4 are provided with plug heads 6. Two longer sides are respectively provided with two plug heads 6, while two shorter sides are respectively provided with one plug head 6. The plug heads 6 protrude outwardly and a notch is provided between two adjacent plug heads 6 on the two longer sides as the spacing support 10 for assembling spacing and self-constraint of welding. At the same time, two plug slots 7 are arranged corresponding to the positions for plugging the two plug heads 6 on the longer sides of the upper cover plate 1 and the lower cover plate 3, the two plug slots 7 are spaced apart by a certain distance so that the notch between the two adjacent plug heads 6 can provide sufficient support for the spacing of the two plug slots 7, so as to prevent the plug slot 7 from being broken due to excessive length, meanwhile fixing and spacing the two adjacent plug heads 6, thereby effectively preventing the misplacement between the plug heads 6 and the plug slots 7 so as to ensure a stable plugging.

As shown in FIG. 3 to FIG. 7, the plug head 6 is a protruded plate disposed at the end of the rib plate 4. The thickness of the protruded plate is t, the width of the plug slot 7 is H, the length of the protruded plate is L, and the length of the plug slot 7 is L', therefore $0 \leq (H-t) \leq 0.5$ mm, and $0 \leq (L'-L) \leq 0.5$ mm, so as to ensure that a welding gap no greater than 0.5 mm is reserved between the plug head 6 and the plug slot 7. The preferred welding gap restriction of 0.5 mm ensures the assembly feasibility, and is also within the adaptability range of the gap of the laser-MAG hybrid welding, therefore it adapts to the gap tolerance of the laser-MAG hybrid welding and the adaptability of the process parameters to the gap during actual welding, and ensures the strong consistency of the welding seams.

The plug slots 7 provided on the upper cover plate 1, the lower cover plate 3 and the web plates 9 are preferably rectangular, and four corners thereof are provided with reliefs 11, which avoids the assembly obstacles meanwhile eliminating the internal stress between the plug heads 6 and the plug slots 7, thereby preventing cracking at the four corners of the plug slot 7 during welding and bearing that affects the overall strength of the structural member. Chamfers 12 are provided on the welding side of the plug slot 7. The angle of the chamfer 12 is preferably 20°, and the depth is preferably 2 mm, which are used for the tracking of the welding seams of the laser-MAG hybrid welding and the filling of the deposited metal.

When the plug head 6 is preferably plugged in the plug slot 7, the end surface of the plug head 6 is flush with the surface of the plug slot 7 to ensure that the surface of the welding seam is smooth and the joint strength of the welding seam is reliable after welding.

The upper cover plate 1 and the lower cover plate 3 are respectively welded to the two side web plates 9 through T-shaped joints that are advantageous for eliminating the stress concentration and facilitating the laser-MAG welding. The T-shaped joint is preferred to leave no gap. Alternatively, the groove with an angle of 20° and a depth of 2 mm can be arranged on the welding side of the web plates 9 so as to ensure the forming of the surface of the welding seam.

In the beam structure of the present embodiment, the coupler mounting assembly includes a coupler mounting plate 5', a mounting fixing plate 8' and reinforcing ribs 13. An extension plate 2' extends outwardly from an end of the web plate 9. The extension plate 2' is preferably a trapezoidal plate, with one side connecting with the web plate 9 being horizontal so as to facilitate welding with the upper cover 1 and the other side having smooth an arc segment to ensure even stress at joint, strong bending resistance and shear resistance. The coupler mounting plate 5' is angle jointed to an end of the extension plate 2' and welded between the upper cover plate 1 and the lower cover plate 3, and the coupler mounting plate 5' is arranged perpendicularly to the upper cover plate 1, the web plates 9 and the lower cover plate 3 respectively. The mounting fixing plate 8' is arranged obliquely on an outer side of the extension plate 2' with one end being welded with the coupler mounting plate 5', and the other end welded with the extension plate 2'. Reinforcing ribs 13 are symmetrically welded on both sides of joint of the web plate 9 and the extension plate 2' for further improving joint strength of the web plate 9 and the extension plate 2'.

In order to ensure a reliable joint between the lower cover plate 3 and the extension plate 2', and to coordinate with the arrangement of the smooth arc segment at the joint of the web plate 9 and the extension plate 2', a patch plate having a smooth arc in cross section is provided at the welding position between the lower cover plate 3 with the web plate 9 and the extension plate 2', so as to ensure a reliable welding of the joint of the lower cover plate 3 with the web plate 9 and the extension plate 2'.

In order to further reduce the weight of the connecting members on the basis of maintaining the original structural strength, it is preferable to provide at least one oblong hole respectively on each of the rib plates 4. Similarly, at least one oblong hole may also be provided on the coupler mounting plate 5' and the mounting fixing plate 8' respectively.

The beam structure of the present embodiment is preferably used as the towing beam of a rail vehicle.

Embodiment VI

The present embodiment provides a hybrid welding method of beam structure, by which the beam structure as described in embodiment V can be welded, so that the weathering steel material can be replaced by the stainless steel material for the whole beam structure, thereby realizing the weight reduction of the beam structure and improving the corrosion resistance of the beam structure, and the beam structure has the process effect of single-sided welding and double-sided forming, which can reduce the welding deformation, solve the problem of serious residual stress, so as to effectively improve the welding quality and realize the maintenance-free manufacturing process of the stainless steel beam structure.

As shown in FIG. 8, the method includes the following steps:

S1. assembling two side web plates 9, rib plates 4 and a lower cover plate 3 on an upper cover plate 1 to form a box-shaped structure;

wherein the rib plate extrudes outwardly with a plurality of plug heads 6, each of which is plugged in the upper cover plate 1, two side web plates 9 and the lower cover plate 3; the upper cover plate 1 and the lower cover plate 3 are arranged oppositely, and the two side web plates 9 are jointed between the upper cover plate 1 and the lower cover plate 3;

S2. welding each of joints from outside of the box-shaped structure by laser-MAG hybrid welding in such a manner that weld the shorter welding seams first and then the longer welding seams, from the center to the two ends and weld symmetrically.

In the embodiment, step S1 further includes: providing a coupler mounting assembly at an end of the upper cover plate 3.

By pre-plugging each of the components of the beam structure, and disposing the welding seams to be welded on the outer surface of the box-shaped structure by the welding connection means of plugging and angle jointing, the method provides a structural basis for the subsequent integral welding process directly from the outside so as to adapt to the single-sided welding and double-sided forming process of the laser-MAG hybrid welding, while effectively reducing the welding length and replacing the longer welding seams with multiple sets of shorter welding seams to ensure the subsequent welding strength. The method allows finally welding orderly on the outside directly, which exerts the advantages of deep fusion penetration, low heat input, small welding deformation and good gap adaptability of the laser-MAG hybrid welding, thereby realizing the maintenance-free manufacturing process of the stainless steel beam structure. In addition, the process above is more conducive to industrial flow production operations, which greatly reduces the production costs. Further, since the laser-MAG hybrid welding is used, the assembly size requirement is effectively reduced, the quality control of flow production is effectively improved and the production efficiency is improved.

In this method, step S1 is the assembling and plugging process of the beam structure prior to welding. In order to facilitate the plugging, a plurality of plug slots 7 are respectively arranged on the upper cover plate 1, the two side web plates 9 and the lower cover plate 3. By plugging and assembling, each of the welding seams to be welded is reserved on the outer surface of the box-shaped structure of the beam structure, so as to weld directly from the outside with single-sided welding. Specifically, step S1 includes the following steps:

S121. plugging the plug heads 6 at a lower portion of the rib plates 4 in the plug slots 7 of the upper cover plate 1;

S122. plugging the plug heads 6 at the two sides of the rib plates 4 in the plug slots 7 of the two side web plates 9 so that the two side web plates 9 are respectively perpendicular to the lower cover plate 3;

S123. plugging the plug heads 6 at an upper portion of the rib plates 4 in the plug slots 7 of the lower cover plate 3, so that the upper cover plate 1 and the lower cover plate 3 are arranged oppositely.

Specifically, reverse mounting method may be used to place the upper cover plate 1 on the assembly welding turntable of the beam structure; and the two side web plates 9, the coupler mounting plate 5, each of the rib plates 4, the mounting fixing plate 8, the reinforcing ribs 13 and the lower cover plate 3 are sequentially assembled correspondingly on the upper cover plate 1. By pressing with tooling after assembling, the complete assembling of the beam structure is completed so as to synchronize the subsequent welding process.

In the embodiment, each of the rib plates 4 is plugged in the upper cover plate 1, the two side web plates 9 and the lower cover plate 3 respectively with each of the plug heads 6. The upper cover plate 1 and the lower cover plate 3 are arranged oppositely. The two side web plates 9 are jointed between the upper cover plate 1 and the lower cover plate 3. The coupler mounting plate 5 is at the same end of the extension plate 2 of the upper cover plate 1, the two side web plates 9 and the lower cover plate 3. The mounting fixing plate 8 is obliquely welded to the outside of the extension plate 2 with one end being welded to the coupler mounting plate 5, and the other end welded to the extension plate 2. Reinforcing ribs 13 are welded symmetrically to both sides of the joint of the web plate 9 and the extension plate 2.

In this method, step S2 is the reverse welding process of the beam structure, it includes:

S201. welding each of plugging joints of the rib plate constitutions between the lower cover plate 3, the two side web plates and the upper cover plate 1 respectively;

S202. welding joints of the lower cover plate 3, the two side web plates 9, the coupler mounting assembly and the upper cover plate 1 respectively in a manner that weld the shorter welding seams first and then the longer welding seams, from the center to the two ends and weld symmetrically, so as to complete the overall structure welding of the beam structure.

With the principle of welding the shorter welding seams first and then the longer welding seams, from the center to the two ends and weld symmetrically, the step S202 above implements the laser-MAG hybrid reverse welding that is mainly for plugging and auxiliary for angle jointing, such as firstly welding the plugging joints of the rib plate constitutions with the upper cover plate 1, the lower cover plate 3 or the web plates 9 respectively, then welding the angled joints of the coupler mounting assembly with the upper cover plate 1, the two side web plates 9 and the lower cover plate 3 respectively, and finally welding the longer welding seams of the web plates 9 with the upper cover plate 1 and the lower cover plate 3 respectively, and the welding is from the center to the two ends and symmetrical. Therefore the strength of the structural members of the beam structure is ensured to be symmetrical so as to ensure the welding quality.

In addition, since the welding process of step S2 is following the assembling process of step S1, the entire beam structure can be assembled first and then welded in the order of the process, so that the frame-type assembly line can be formed and the production efficiency can be improved.

Embodiment VII

On the basis of the method of embodiment VI, the present embodiment provides a more complete embodiment of the beam structure welding process for further perfecting the method described in embodiment VI in detail.

The method described in the present embodiment is based on the processing principle that the assembly is first and the component is following. According to the order, the manufacturing process of the beam structure includes: three steps of assembling of the beam structure, traverse welding of the beam structure and processing of the coupler mounting plate.

Step (1) of assembling of the beam structure: as described in the step S1 in embodiment VII, the specific steps are not repeated; as long as clamping with tooling after the assembling;

Step (2) of traverse welding of the beam structure: as described in the step S2 in embodiment VII, the specific steps are not repeated; as long as using the traverse welding process during hybrid welding, and performing cooling after welding and finally unloading the pressing tooling;

Step (3) of processing of the coupler mounting plate: machining the coupler mounting plate 5' at the end portion, wherein the processing volume is no more than 2 mm.

Embodiment VIII

The present embodiment provides a rail vehicle including the beam structure as described in each of the embodiments above. The beam structure is welded through the methods as described in each of the embodiments above. On the basis of ensuring the reliability of the beam structure strength, the rail vehicle realizes the integral welding of the stainless steel structure, and realizes self-constraint of welding of the beam structure with the self-rigidity of the plugging structure. The rail vehicle exerts the advantages of deep fusion penetration, low heat input, small welding deformation and good gap adaptability of the laser-MAG hybrid welding, and realizes the maintenance-free manufacturing process of the stainless steel beam structure, thereby effectively improving the manufacturing process efficiency of the rail vehicle and reducing the production costs.

It should be noted that, in the actual implementation, the basic solution of the present disclosure can be combined with the prior art to generate various specific embodiments. The description of each of the embodiments above is based on laser-MAG hybrid welding, but it is also applicable to the hybrid welding that is easily conceivable for the person skilled in the art, such as laser-MIG laser-TIG and laser-plasma etc. Therefore, the coupling ultrasonic effects for such hybrid welding process should be within the scope of the claims of the present disclosure.

In summary, for the beam structure and hybrid welding method thereof described by the present disclosure, by welding the stainless steel beam structure with the laser-MAG hybrid welding, and optimizing the plugging structure of the rib plates 4, the box-shaped structure can be assembled first, and then each of the joints of the box-shaped structure is welded directly from the outside during manufacturing, so that the beam structure can replace the weathering steel material as a whole, thereby realizing the weight reduction of the beam structure and improving the corrosion resistance of the beam structure; by disposing the welding seams to be welded on the outer surface of the box-shaped structure through the welding connection means of plugging and angle jointing, the single-sided welding and double-sided forming process of the laser-MAG hybrid welding is adapted; by realizing the self-constraint of welding of the beam structure with the self-rigidity of the plugging structure, the advantages of deep fusion penetration, low heat input, small welding deformation and good gap adaptability of the laser-MAG hybrid welding are exerted, and the maintenance-free manufacturing process of the stainless steel beam structure are realized, thereby effectively improving the manufacturing process efficiency of the rail vehicle and reducing the production costs.

The method can ensure the depth of fusion and the penetration of the welded joints, the accessibility of the welding position and the adaptability of the welding gaps, so that it can be adapted to the laser-MAG hybrid welding process, thereby developing the hybrid welding method of the beam structure that is mainly for plugging and auxiliary for angle jointing and uses the full-penetrated laser-MAG hybrid welding process, so that the welding seams of the beam structure have the characteristics of narrow welding gap, deep fusion penetration and good gap adaptability, thereby realizing the maintenance-free welding and manufacturing of the new stainless steel beam structure. The beam structure welded with the method satisfies the design requirements of lightweight of the structure, and the optimized beam structure has a weight loss of more than 20% compared with the conventional structure. The beam structure as a whole can be made of austenitic stainless steel material and has the advantages of excellent corrosion resistance, no need for paint coating and anti-corrosion; the beam structure is a box-shaped beam structure designed with the plugging structure that is mainly for plugging and auxiliary for angle jointing, which can ensure the assembly accuracy, self-constrained rigidity of the structure, accessibility of the welding position and the consistency of the welding gaps.

The embodiments of the present disclosure are presented for the purposes of illustration and description, and are not intended to be exhaustive or to limit the present disclosure to the disclosed forms. Various modifications and variations are obvious to the person of ordinary skills in the art. The embodiments were chosen and described in order to better illustrate the principles and practical applications of the present disclosure, and to make the person of ordinary skills in the art to appreciate the present disclosure so as to design various embodiments suitable for specific uses with various modifications.

What is claimed is:

1. A hybrid welding method of a towing beam, comprising the following steps:
    S1. assembling two side web plates, a coupler mounting assembly, at least one rib plate and a lower cover plate on an upper cover plate to form a rectangular box-shaped structure in a reverse mounting order;
        wherein each rib plate protrudes outwardly with a plurality of plug heads, the upper cover plate, the two side web plates and the lower cover plate are respectively provided with a plurality of plug slots, the respective plug heads are plugged within the plug slots of the upper cover plate, the two side web plates and the lower cover plate; a plurality of plug heads are simultaneously provided at each end of the rib plate, a spacing support is provided between two adjacent plug heads on each end of the rib plate, a plurality of plug slots are arranged corresponding to the upper cover plate and the lower cover plate and two adjacent plug slots are spaced apart by a spacing and the spacing support provides support for the spacing;
        the upper cover plate and the lower cover plate are respectively welded to the two side web plates through T-shaped joints;
        the upper cover plate and the lower cover plate are arranged oppositely, the two side web plates are connected between the upper cover plate and the lower cover plate and the coupler mounting assembly is disposed at the end of the upper cover plate;
    S2. welding each of joints from outside of the rectangular box-shaped structure by laser-MAG hybrid welding in such a manner that weld the shorter welding seams first and then the longer welding seams, from the center to the two ends and weld symmetrically;
        wherein the step S2 includes:
        S201. welding plugging joints of the rib plate between the lower cover plate, the two side web plates and the upper cover plate respectively;
        S202. welding joints of the lower cover plate, the coupler mounting assembly, the two side web plates and the upper cover plate respectively in such a manner that weld the shorter welding seams first and then the longer welding seams, from the center to the two ends and weld symmetrically;
        in the step S202, firstly welding the plugging joints of the rib plate with the upper cover plate, the lower cover plate or the web plates respectively, then welding the angled joints of the coupler mounting assembly with the upper cover plate, the two side web plates and the lower cover plate respectively, and finally welding the longer welding seams of the web plates with the upper cover plate and the lower cover plate respectively, and the welding is from the center to the two ends and symmetrical.

2. The method of claim 1, wherein the step S1 includes:
    S121. plugging the plug heads at a lower portion of the rib plates in the plug slots of the upper cover plate;
    S122. plugging the plug heads at the two sides of the rib plates in the plug slots of the two side web plates respectively;
    S123. plugging the plug heads at an upper portion of the rib plates in the plug slots of the lower cover plate.

3. The method of claim 2, wherein a welding gap no greater than 5 mm is provided between the plug head and the plug slot when the plug head is plugged in the plug slot.

4. The method of claim 1, wherein the coupler mounting assembly comprises a coupler mounting plate, a mounting fixing plate and reinforcing ribs; an extension plate extends outwardly from an end of the web plate; the coupler mounting plate is angle jointed to an end of the extension plate and welded between the upper cover plate and the lower cover plate, and the coupler mounting plate is arranged perpendicularly to the upper cover plate, the web plates and the lower cover plate respectively; the mounting fixing plate is arranged obliquely on an outer side of the extension plate with one end being welded with the coupler mounting plate, the other end is welded with the extension plate; reinforcing ribs are symmetrically welded on both sides of joint of the web plate and the extension plate.

5. A towing beam, comprising a lower cover plate, an upper cover plate and two side web plates jointed between the upper cover plate and the lower cover plate; wherein the lower cover plate and the two side web plates are assembled on the upper cover plate in a reverse mounting order, the two side web plates are arranged perpendicularly to the upper cover plate and the lower cover plate, respectively to form a hollow rectangular box-shaped structure, a coupler mounting assembly is welded at an end of the rectangular box-shaped structure, and at least one rib plate is welded within the rectangular box-shaped structure, each rib plate protrudes outwardly with a plurality of plug heads, the upper cover plate, the two side web plates and the lower cover plate are respectively provided with a plurality of plug slots, the respective plug heads are plugged within the plug slots of the upper cover plate, the two side web plates and the lower cover plate; a plurality of plug heads are simultaneously provided at each end of the rib plate, a spacing support is provided between two adjacent plug heads on each end of the rib plate, a plurality of plug slots are arranged correspondingly to the upper cover plate and the lower cover plate and two adjacent plug slots are spaced apart by a spacing and the spacing support provides support for the spacing; the upper cover plate and the lower cover plate are respectively welded to the two side web plates through T-shaped joints;
    the towing beam is fixed by laser-MAG hybrid reverse welding from outside of the rectangular box-shaped structure.

6. The towing beam structure of claim 5, wherein a welding gap no greater than 5 mm is provided between the plug head and the plug slot when the plug head is plugged in the plug slot.

7. The towing beam structure of claim 6, wherein the coupler mounting assembly comprises a coupler mounting plate, a mounting fixing plate and reinforcing ribs; an extension plate extends outwardly from an end of the web plate; the coupler mounting plate is angle jointed to an end of the extension plate and welded between the upper cover plate and the lower cover plate, and the coupler mounting plate is arranged perpendicularly to the upper cover plate, the web plates and the lower cover plate respectively; the mounting fixing plate is arranged obliquely on an outer side of the extension plate with one end being welded with the coupler mounting plate, the other end is welded with the extension plate;
reinforcing ribs are symmetrically welded on both sides of joint of the web plate and the extension plate.

8. The towing beam structure of claim 5, wherein the coupler mounting assembly comprises a coupler mounting plate, a mounting fixing plate and reinforcing ribs; an extension plate extends outwardly from an end of the web plate; the coupler mounting plate is angle jointed to an end of the extension plate and welded between the upper cover plate and the lower cover plate, and the coupler mounting plate is arranged perpendicularly to the upper cover plate, the web plates and the lower cover plate respectively; the mounting fixing plate is arranged obliquely on an outer side of the extension plate with one end being welded with the coupler mounting plate, the other end is welded with the extension plate;

reinforcing ribs are symmetrically welded on both sides of joint of the web plate and the extension plate.

9. A rail vehicle, comprising the towing beam of claim 5.

* * * * *